July 19, 1960

C. A. GIBBS 2,945,491

MANIPULATIVE HOLDER FOR TESTING PURPOSES

Filed Oct. 27, 1958

INVENTOR
CLEO A. GIBBS

BY W. E. Sherwood

ATTORNEY

United States Patent Office 2,945,491
Patented July 19, 1960

2,945,491

MANIPULATIVE HOLDER FOR TESTING PURPOSES

Cleo A. Gibbs, 105 Hancock St., Henderson, Ky.

Filed Oct. 27, 1958, Ser. No. 769,657

2 Claims. (Cl. 128—2)

This invention relates to a new and improved holder and more particularly to a manipulative holder which may be employed in body cavities. While the invention is especially well adapted for use in testing conditions existing within the body, it may also be employed for purposes of medication or the like. One usage for which the holder is well adapted is in connection with testing for conditions of ovulation. As is known, an increase in the glucose concentration of the cervical mucus accompanies ovulation and this condition may be readily detected by means of testing paper or the like brought into contact with the cervix and later visually inspected. However, the mechanical agency by means of which the testing member may be transported to and from testing position, especially by non-technically trained users, has presented certain problems which it is a purpose of this invention to overcome.

One such problem is found in the retention of the testing member upon the holder especially when fragile members, such as litmus type paper strips are used. The wet strength of such paper is normally quite weak and unless precautions are taken, such paper may be torn during the testing, or during assembly or disassembly of the holder, or may even be detached from the holder while in the body cavity.

An object of the invention is to provide an improved holder for retaining a test member in prescribed position during use in body cavities.

Another object is to provide a sanitary holder for use in body cavities.

Another object is to provide a light weight, smooth surface, inexpensive holder.

A further object is to provide a holder which may be readily assembled and disassembled.

Other objects and advantages will become apparent as the description proceeds and when considered in conjunction with the accompanying drawings in which.

In accordance with the invention there is provided a simple holder having an elongated stem member cooperating with a head member which may be readily attached to or detached from the stem member. The stem member has an interior cavity within which the ends of a testing strip or the like may be disposed and with this strip lying in a protective recess at the exposed surface of the head member. The means for fastening the stem and head members together preferably provides jointly for the strip to be held against an abutting surface on the head member and to be retained in lodged position in the recess during the fastening or unfastening of the stem and head members.

Figure 1:
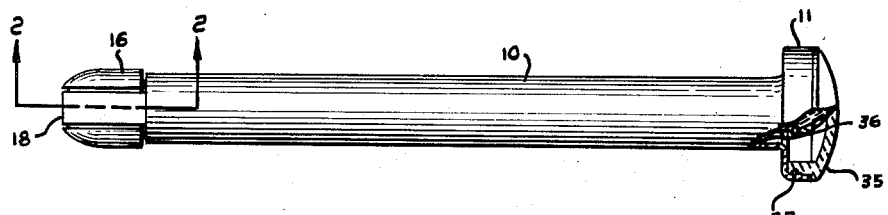
Fig. 1 is a view of the assembled holder with a testing strip in position and with portions of the holder broken away.
Figure 3:
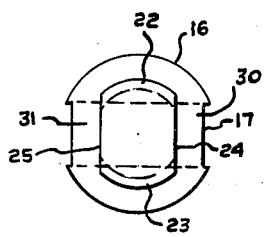
Fig. 3 is an end view of one form of head member of the holder with the testing strip removed.

Referring first to Fig. 1, the elongated stem member 10 may be formed either as a hollow tube or as a rod of suitable material compatible with use in body cavities. Various plastics which are unharmed by immersion in boiling water or in sterilizing solutions, are suitable for such use. At one end the stem member, which may be of any selected length, is provided with a knob-like portion 11, by means of which the article may be manipulated. The outer surface of the member 10 is preferably smooth.

Figure 2:
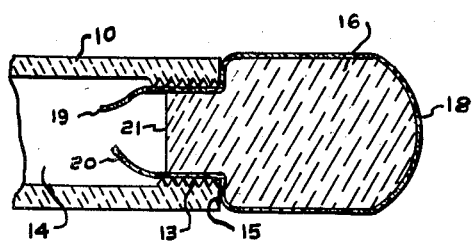
Fig. 2 is a view along line 2—2 of Fig. 1 and to a larger scale.
Figure 4:
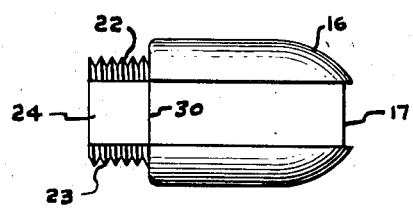
Fig. 4 is a side elevation view of the head member of Figure 3.

At its other end the stem member, as best seen in Fig. 2, is provided with a fastening means, here shown as a circumferential screw thread 13 interiorly formed within the cavity 14 found at this end of the stem member. The extreme end of the stem member is preferably formed with a flat surface 15 for a purpose which will later appear.

The rearwardmost part of the head member 16 may have, if desired, a lateral cross sectional dimension equal to the lateral cross sectional dimension of the forwardmost part of the stem member so that as the two members are fully joined together the sides of the holder provide a smooth substantially unbroken surface. The forwardmost end of the head member preferably is convex in shape and the same type of material used for the stem member may also be used for the head member.

As a significant feature of the invention, a shallow groove 17 is formed axially along the exterior sides of the head member continuing across the convex end thereof and this groove is adapted to retain with a snug fit, the strip of testing material 18 as seen in Figs. 1 and 2. For example, a strip of litmus type paper about 2.3 inches in length, 0.25 inch in width and 0.015 inch in thickness has been found suitable for use with the holder. The recess 17 accordingly is given a depth and width which permits the strip to lie substantially flush with the exterior surface of head member 16, thus permitting the strip to become readily saturated during use but being protected meanwhile against dislodging stresses by reason of its contact with the edge walls of the shallow recess.

As a further significant feature, a space for the testing strip is provided through the fastening means so that the ends 19 and 20 of the strip may be housed within the holder and retained in dry condition, thus to serve as handling means when the used strip is to be removed from the holder. Various forms of fastening means for the stem and head members may be used without departing from the invention. In one convenient form, the head member 16 may include a projection 21 fitting into cavity 14 of the stem member and having interrupted threads 22 and 23 engageable with the threads 13 of the stem member. Separating the interrupted threads are two spaces 24 and 25 having a depth commensurate with the thickness of the strip of testing material. These spaces 24 and 25 are formed as a continuation of recess 17 and are in axial alignment therewith. Accordingly, when the user prepares the article for a test, the center portion of the strip is laid in the groove at the convex tip of the head member and the strip portions adjacent the ends are laid in the spaces 24 and 25 with the extreme ends 19 and 20 hanging free. The stem member is then brought to the head member with the cavity 14 enclosing the free ends of the strip. Merely by rotating the stem member, the head and stem are then assembled without dislodging the strip. The frictional engagement of the strip with the surfaces of the recess 17 and spaces 24 and 25 normally is sufficient to hold the strip in place.

However, as an additional securing feature, it is preferred to utilize also the end 15 of the stem as a clamp for the strip. In this arrangement the rearward side of the head member may be provided with flat surfaces 30 and 31 against which the strip may be positively clamped by end 15 of the stem member when the parts are fully joined together. Normally, the strip material is compressible and no undercutting of the rearward side of the head member is needed in order to accommodate the thus-described clamped strip.

The invention, however, comprehends the use of such undercutting when it is desired to cause a full abutting of the stem and head members or when a non-compressible testing strip is employed. The several parts of the holder may be of molded materials and when a light weight holder is desired, the stem member may comprise a hollow tube to which a cover member 35 may be attached in order to form a closed knob 11. However, this is not essential and, if desired, the hollow tube may be open throughout its length. When the cover member is used, it may include a groove 36 adapted to receive a bead 37 on the interior of the enlarged knob portion thus to hold the parts together by reason of the resiliency of the molded materials.

With the article assembled as shown in Fig. 1 it may be inserted in the body cavity using the knob 11 as a manipulating means. After the strip is saturated and its change of color is noted, the test is concluded. The stem is then disconnected from the head member and the strip is readily removed by pulling upon one or more of the dry ends 19 and 20 thereof. The holder may then be readily sterilized by immersion of the separated stem and head members in boiling water or in a chemical cleansing solution.

Having thus described a preferred embodiment of the invention, it will be obvious to those skilled in the art that various changes and modifications may be made therein without departing from the spirit and scope of the invention and it, therefore, is intended to cover in the appended claims, all such equivalent variations and modifications.

What is claimed is:

1. A holder of the class described comprising an elongated stem member having a smooth external surface and mounting at one end a detachable head member, said head member having a convex outer end and a continuous recess extending axially along opposite sides and across the convex outer end thereof for receiving therein a detachable testing strip, and threaded means for detachably joining said head and stem members and including a circumferential inner thread at said one end of said stem member and a pair of circumferentially spaced interrupted external thread portions on an axial extension of said head member adapted to fit within said stem member, the interruptions between said external thread portions being respectively in axial alignment with said recess portions on the two sides of said head member and forming spaces sufficient to receive the respective end portions of said strip during the engagement of said head and stem members, said head and stem members having cooperating surfaces thereon shaped to hold said strip securely against removal when said head and stem members are fully engaged.

2. A holder as described in claim 1 wherein said stem member contains a cavity for housing the ends of said strip and for maintaining them in substantially dry condition.

References Cited in the file of this patent

UNITED STATES PATENTS

| | | |
|---|---|---|
| 2,090,354 | Massman | Aug. 17, 1937 |
| 2,664,879 | Hardy | Jan. 5, 1954 |
| 2,739,585 | Ayre | Mar. 27, 1956 |